United States Patent
Kitamura et al.

(10) Patent No.: US 11,936,250 B2
(45) Date of Patent: Mar. 19, 2024

(54) ROTARY RECIPROCATING DRIVE ACTUATOR

(71) Applicants: Yasutaka Kitamura, Tokyo (JP); Yuki Takahashi, Tokyo (JP); Masaharu Kagami, Tokyo (JP); Yuki Otsuka, Tokyo (JP)

(72) Inventors: Yasutaka Kitamura, Tokyo (JP); Yuki Takahashi, Tokyo (JP); Masaharu Kagami, Tokyo (JP); Yuki Otsuka, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 296 days.

(21) Appl. No.: 17/395,401

(22) Filed: Aug. 5, 2021

(65) Prior Publication Data
US 2022/0043255 A1    Feb. 10, 2022

(30) Foreign Application Priority Data

Aug. 7, 2020    (JP) .................................. 2020-135232

(51) Int. Cl.
*H02K 33/14*    (2006.01)
*G02B 26/08*    (2006.01)
(Continued)

(52) U.S. Cl.
CPC ............. *H02K 11/22* (2016.01); *H02K 33/12* (2013.01); *H02K 33/16* (2013.01); *G02B 26/0816* (2013.01); *G02B 26/10* (2013.01)

(58) Field of Classification Search
CPC ........ H02K 33/12; H02K 33/16; H02K 11/22; G02B 26/10; G02B 26/0816
(Continued)

(56) References Cited

U.S. PATENT DOCUMENTS

| 5,880,452 A * | 3/1999 | Plesko ............... G06K 7/10653 |
| | | 235/462.43 |
| 2005/0116800 A1* | 6/2005 | Nelson .................. H02K 26/00 |
| | | 310/36 |
| 2021/0265904 A1* | 8/2021 | Takahashi ............ H02K 11/215 |

FOREIGN PATENT DOCUMENTS

| JP | H05-083920 A | 4/1993 |
| JP | 06233514 A * | 8/1994 ............. H02K 33/00 |
| (Continued) |

OTHER PUBLICATIONS

Extended European Search Report dated Dec. 20, 2021.

*Primary Examiner* — Burton S Mullins
(74) *Attorney, Agent, or Firm* — Shih IP Law Group, PLLC.

(57) ABSTRACT

A movable magnet is configured by alternately magnetizing an even number of magnetic poles at an outer periphery of a shaft part; a number of core magnetic poles as magnetic poles of a core body and a number of magnetic poles of the movable magnet are equal to each other; the core magnetic poles are disposed to face the movable magnet with an air gap therebetween on an outer peripheral side of the movable magnet in a direction orthogonal to the shaft part; a drive unit is provided with a magnet position holding part provided to face the movable magnet and magnetically attracts the movable magnet to a reference position; the core body is formed to surround an even number of the core magnetic poles; and a coil body is disposed at the core body adjacent to each of the even number of the core magnetic poles.

10 Claims, 12 Drawing Sheets

(51) Int. Cl.
*G02B 26/10* (2006.01)
*H02K 11/22* (2016.01)
*H02K 33/12* (2006.01)
*H02K 33/16* (2006.01)

(58) Field of Classification Search
USPC .......................................................... 310/36
See application file for complete search history.

(56) References Cited

FOREIGN PATENT DOCUMENTS

| | | | | |
|---|---|---|---|---|
| JP | 4727509 B2 * | 4/2011 | ............. | G02B 26/10 |
| JP | 4727509 B2 | 7/2011 | | |
| NO | 2020004514 A1 | 1/2020 | | |

* cited by examiner

ROTARY RECIPROCATING DRIVE ACTUATOR

CROSS REFERENCE TO RELATED APPLICATIONS

This application is entitled to (or claims) the benefit of Japanese Patent Application No. 2020-135232, filed on Aug. 7, 2020, the disclosure of which including the specification, drawings and abstract is incorporated herein by reference in its entirety.

TECHNICAL FIELD

The present invention relates to a rotary reciprocating drive actuator.

BACKGROUND ART

For example, a rotation drive actuator is used in a scanner in a multifunction peripheral, a laser beam printer and other apparatuses. Specifically, a rotary reciprocating drive actuator changes a reflection angle of a laser beam by rotating a mirror of the scanner in a reciprocating manner to realize optical scanning with respect to an object.

Conventionally, the scanner using a galvanometer motor as this type of the rotary reciprocating drive actuator is disclosed in such as PTL 1. Various types of the galvanometer motor, such as a coil movable type in which a coil is attached to the mirror and a structure disclosed in PTL 1, are known.

PTL 1 discloses a beam scanner in which four permanent magnets are provided on a rotating shaft to which the mirror is attached so as to be magnetized in the radial direction of the rotating shaft, and a core including magnetic poles around which the coil is wound is disposed so as to sandwich the rotating shaft.

CITATION LIST

Patent Literature

PTL 1: Japanese Patent No. 4727509

SUMMARY OF INVENTION

Technical Problem

By the way, in the rotary reciprocating drive actuator of the coil movable type, heat generated by the coil during driving may adversely affect such as a surface state of the mirror, a bonding state of the mirror to the rotating shaft and a shape of the mirror including a warp. Further, in the rotary reciprocating drive actuator of the coil movable type, considering a heat generation of the coil at the time of energization, there are problems that an input current to the coil is difficult to increase and a size and an amplitude of the mirror to be a movable body are difficult to increase. Further, there is a problem that an assemblability is poor, because it is necessary to pull out wirings to the coil to a fixed body side with respect to the mirror to be the movable body.

In PTL 1, since the magnets are disposed on the movable body side, the above problem of the coil movable type can be solved. In PTL 1, however, two magnets per one core pole and a total of four magnets are required in order to make the magnet stationary at the neutral position with respect to the core, that is, in order to position a switching portion of the magnetic pole of the magnet at the center of the core.

Thereby, there is a problem that the amplitude of the movable body is reduced, that is, a swing range is reduced, as compared with the case where an equivalent rotary reciprocating drive actuator is configured by using two poles magnet, for example. Further, since at least four magnets are used, a number of parts is large, the structure is complicated and the assembly is difficult.

In addition, in recent years, it is expected that the mirror to be the movable body will become bigger in the rotary reciprocating drive actuator used in the scanner. In the case that the mirror is big, in a structure rotatably supporting the movable body in a cantilever manner using with the rotary reciprocating drive actuator shown in PTL1, it lacks rigidity and it is difficult to ensure a shock resistance and a vibration resistance.

Further, if an electromagnetic conversion efficiency is low in the rotary reciprocating drive actuator, there are problems that an output is reduced, it is difficult to obtain a predetermined rotation angle, and it is difficult to drive at high speed.

Based on these problems, it is desired that a rotary reciprocating drive actuator that has a rigidity, a shock resistance and a vibration resistance, can improve an ease of assembling and can achieve a high amplitude.

The present invention has been made in consideration of the above points, and provides a rotary reciprocating drive actuator which can be easily assembled and can drive a movable object at a high amplitude by increasing an electromagnetic conversion efficiency to improve an output.

Solution to Problem

According to one aspect of a rotary reciprocating drive actuator of the present invention, the rotary reciprocating drive actuator comprising:

a base part;

a movable magnet fixed to a shaft part to which a movable object is connected; and a drive unit including a core body and a coil body disposed around outside of a part of the core body, the drive unit being configured to generate a magnetic flux in the core body when a current is supplied, and drive the movable magnet in a rotary reciprocating manner by an electromagnetic interaction between the magnetic flux generated from the core body and the movable magnet, wherein the movable magnet is formed in a ring shape, and is configured by alternately magnetizing an even number of magnetic poles forming an S-pole and an N-pole at an outer periphery of the shaft part;

a number of core magnetic poles as magnetic poles of the core body and a number of magnetic poles of the movable magnet are equal to each other;

the core magnetic poles are disposed to face the movable magnet with an air gap therebetween on an outer peripheral side of the movable magnet in a direction orthogonal to the shaft part;

the drive unit is provided with a magnet position holding part which is a magnetic material provided to face the movable magnet and magnetically attracts the movable magnet to a reference position of an operation;

the core body is formed to surround an even number of core magnetic poles, and has a shape in which the core magnetic poles are continuous; and the coil body is disposed at the core body adjacent to each of the even number of the core magnetic poles.

Advantageous Effects of Invention

According to the present invention, it can be easily assembled and can drive a movable object at a high amplitude by increasing an electromagnetic conversion efficiency to improve an output.

DESCRIPTION OF EMBODIMENTS

Hereinafter, embodiments of the present invention will be described with reference to the drawings.

<Entire Configuration of a Rotary Reciprocating Drive Actuator>

Figure 1:
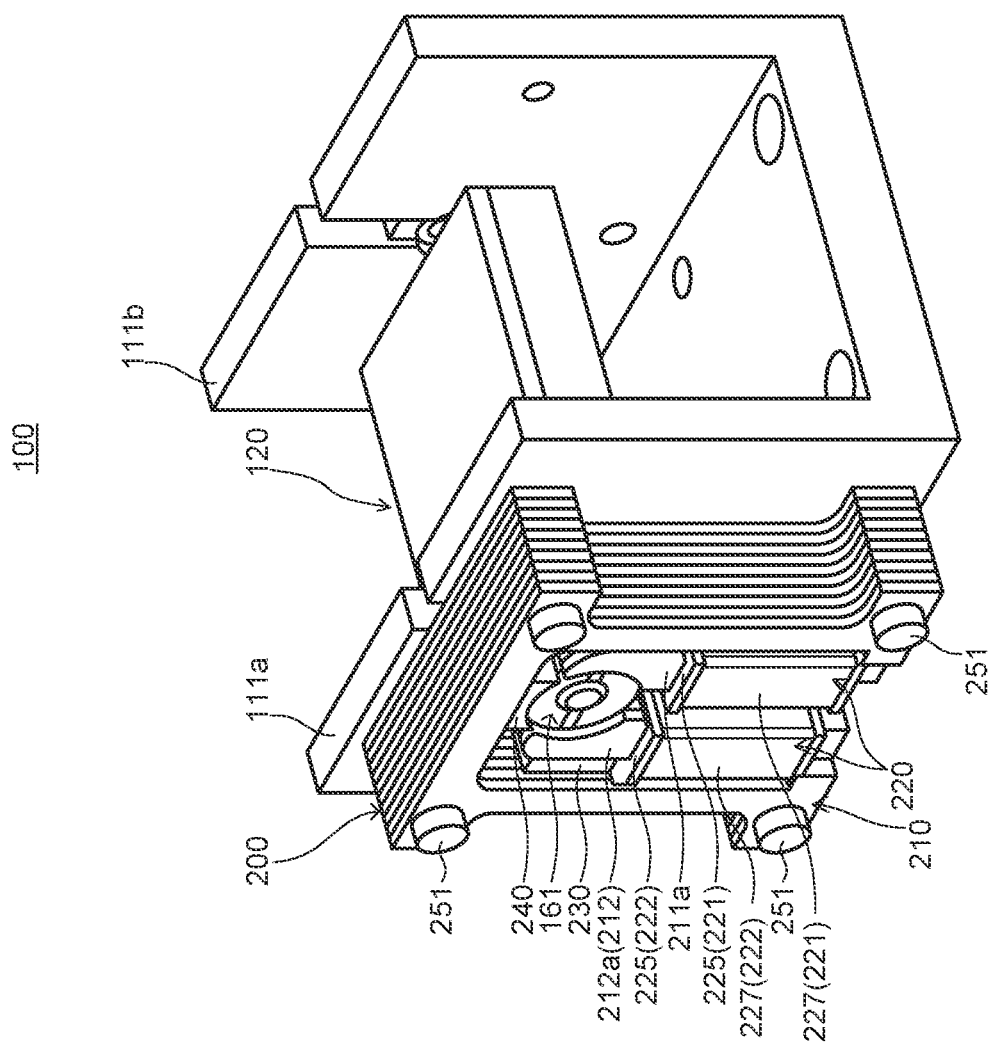
FIG. 1 is an external perspective view of a rotary reciprocating drive actuator of an embodiment.
Figure 2:
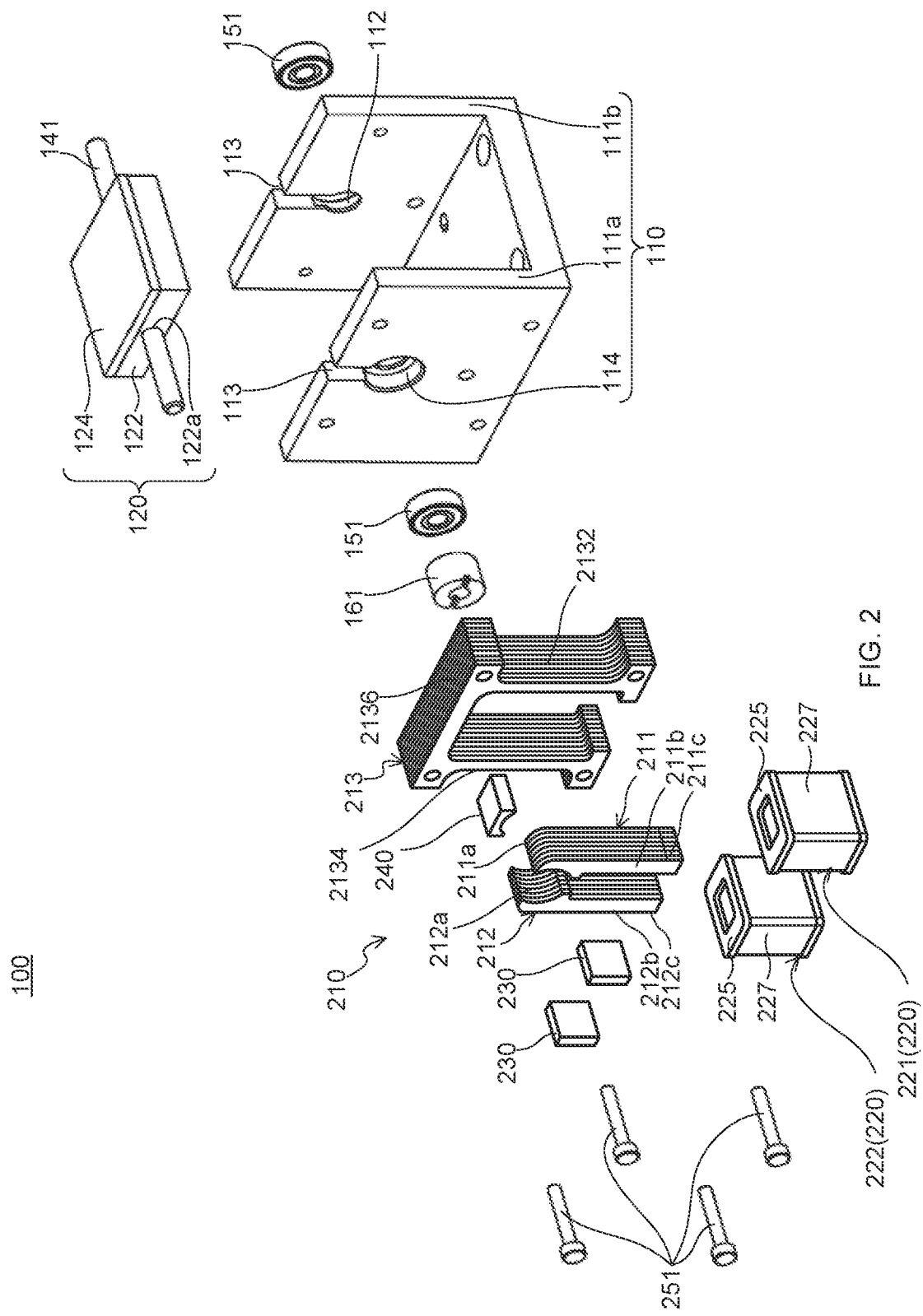
FIG. 2 is an exploded perspective view of the rotary reciprocating drive actuator.

FIG. 1 is an external perspective view of rotary reciprocating drive actuator 100 of the embodiment. FIG. 2 is an exploded perspective view of rotary reciprocating drive actuator 100.

Rotary reciprocating drive actuator 100 is used, for example, in a LIDAR (Laser Imaging Detection and Ranging) apparatus. Note that, rotary reciprocating drive actuator 100 is also applicable to an optical scanner device in a multifunction peripheral, a laser beam printer and other apparatus.

Rotary reciprocating drive actuator 100 roughly has base part 110; mirror part 120 rotatably supported by base part 110; and drive unit 200 for driving mirror part 120 in a rotary reciprocating manner.

Mirror part 120 is a part of a movable object in rotary reciprocating drive actuator 100 and constitutes a movable body together with shaft part 141. Mirror part 120 is formed by attaching mirror 124 to one surface of mirror holder 122, as shown in FIGS. 1 and 2. Mirror holder 122 has insertion hole 122a, shaft part 141 is inserted into insertion hole 122a, and mirror holder 122 and shaft part 141 are fixed.

Base part 110 is configured of a member which has a pair of wall parts 111a and 111b, and in which cross-section is a substantially U-shape. Insertion hole 112 through which shaft part 141 is inserted is formed in each of the pair of wall parts 111a and 111b. Further, notched holes 113 communicating insertion holes 112 and the outer edges of wall parts 111a and 111b are formed in the pair of wall parts 111a and 111b, respectively.

Thus, shaft part 141 can be disposed at positions of insertion holes 112 through notched holes 113 in a state where mirror part 120 is fastened to shaft part 141. In the case where notched holes 113 are not provided, a complicated assembly operation is required in which shaft part 141 is inserted into both insertion holes 112 of wall parts 111a, 111b and insertion hole 122a of mirror holder 122 while mirror part 120 is disposed between the pair of wall parts 111a and 111b, and shaft part 141 and mirror holder 122 are fastened. In contrast, in the present embodiment, since notched holes 113 are formed, shaft part 141 to which mirror part 120 is fastened in advance can be easily inserted into insertion holes 112.

Ball bearings (bearings) 151 are attached to both end portions of shaft part 141. Ball bearings 151 are mounted to bearing mounting parts 114 formed at the positions of insertion holes 112 of the pair of wall parts 111a and 111b. Thus, shaft part 141 is rotatably attached to base part 110 via ball bearings 151, and mirror part 120 is disposed between the pair of wall parts 111a and 111b.

Further, movable magnet 161 is fastened to one end of shaft part 141. Movable magnet 161 is disposed inside of drive unit 200 and is driven in the rotary reciprocating manner by a magnetic flux generated by drive unit 200. Specifically, by a cooperation with coil bodies 220, movable magnet 161 rotates shaft part 141 of the movable body in one direction and in the other direction around the shaft from the movement reference position in the reciprocating manner with respect to base part 110.

Positioning the movable body including shaft part 141 at the movement reference position means that movable magnet 161 is positioned at a neutral position with respect to magnetic poles 211a and 212a of core body 210 excited by coil bodies 220 in the present embodiment. This neutral position is a position capable of rotating similarly in both one direction and the other direction around the shaft (normal rotation and reverse rotation viewed from shaft part 141 side).

Figure 3:
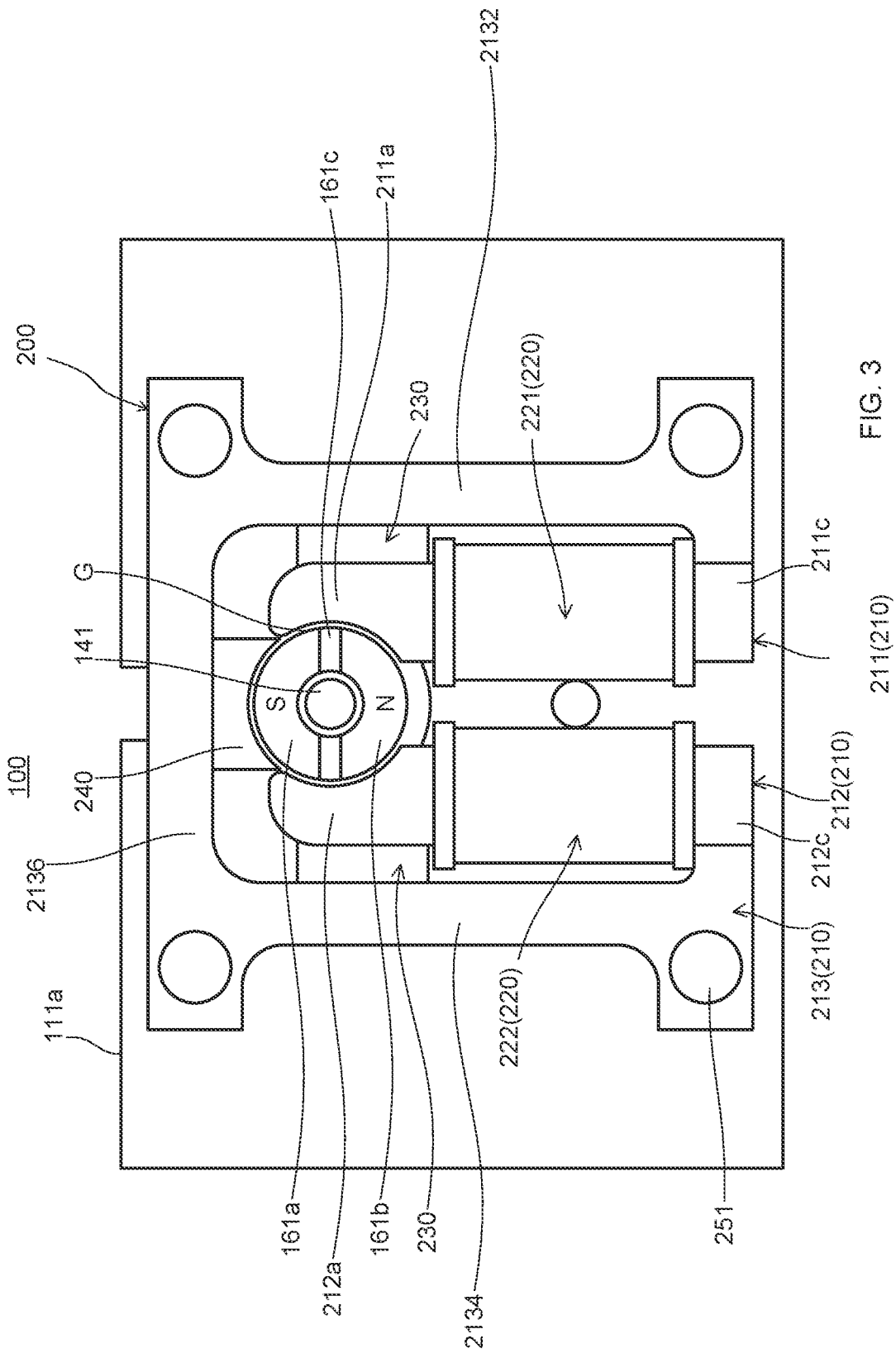
FIG. 3 is a side view of the rotary reciprocating drive actuator of FIG. 1 viewed from a drive unit side.

Movable magnet 161 is formed in a ring shape, and has an even number of magnetic poles 161a, 161b in which an S-pole (a South pole) and an N-pole (a North poles) are alternately magnetized in a direction orthogonal to the rotational axis direction of shaft part 141 at an outer periphery of shaft part 141 (see FIG. 3). Although movable magnet 161 is magnetized to two poles in the present embodiment, it may be magnetized to two or more poles depending on an amplitude at the time of movement.

The even number of magnetic poles 161a and 161b has magnetization surfaces of different polarities facing opposite direction to each other across shaft part 141. In the present embodiment, magnetic poles 161a and 161b have different polarities in which a plane along the axial direction of shaft part 141 is as a boundary thereof.

Further, the even number of magnetic poles 161a and 161b is configured to magnetize at equal intervals at the outer periphery of shaft part 141.

As described above, in movable magnet 161, the even number of magnetic poles 161a and 161b forming the S-pole and the N-pole is alternately disposed at the outer periphery of shaft part 141, and the magnetic poles 161a and 161b are disposed at equal intervals.

More specifically, in movable magnet 161, each of semicircular portions constitutes different magnetic poles 161a and 161b. Arc shaped curved surfaces of the semicircular portions are magnetization surfaces of different magnetic poles 161a and 161b, and the magnetization surfaces of different magnetic poles 161a and 161b are configured to extend in a circumferential direction around an axis.

In other words, the magnetization surfaces of magnetic poles 161a and 161b are disposed in a direction orthogonal to the axial direction of shaft part 141, and are rotated to be able to face to magnetic pole 211a of first core body 211 and magnetic pole 212a of second core body 212, respectively.

The number of magnetic poles of movable magnet 161 is equal to the number of magnetic poles of core body 210.

Magnetic pole switching portions 161c of magnetic poles 161a and 161b of movable magnet 161 are located at positions facing center positions in a width direction of magnetic pole 211a of first core body 211 and magnetic pole 212a of second core body 212 when coil bodies 220 are not energized. Movable magnet 161 has two poles of magnetic poles 161a and 161b in the present embodiment. When movable magnet 161 is held at a rotational angle position by magnet position holding part 240 described later, magnetic pole switching portions 161c are located at positions that are symmetrical in a line centered on shaft part 141 with respect to each of magnetic pole 211a and magnetic pole 212a. Thus, by disposing end portions of magnetic pole switching portions 161c toward magnetic poles 211a and 212a to dispose the movable object to correspond to a direction thereof, a rotational direction of shaft part 141 is determined for an excitation to coil 227, and a torque of shaft part 141 can also be maximized.

Shaft part 141 to which mirror part 120 to be the movable object is attached is pivotally supported by the pair of wall parts 111a and 111b of base part 110 so as to support mirror part 120 from both sides. Thus, mirror part 120 is supported more firmly than the case where shaft part 141 is pivotally supported in a cantilever manner, and a shock resistance and a vibration resistance are improved.

Figure 4:
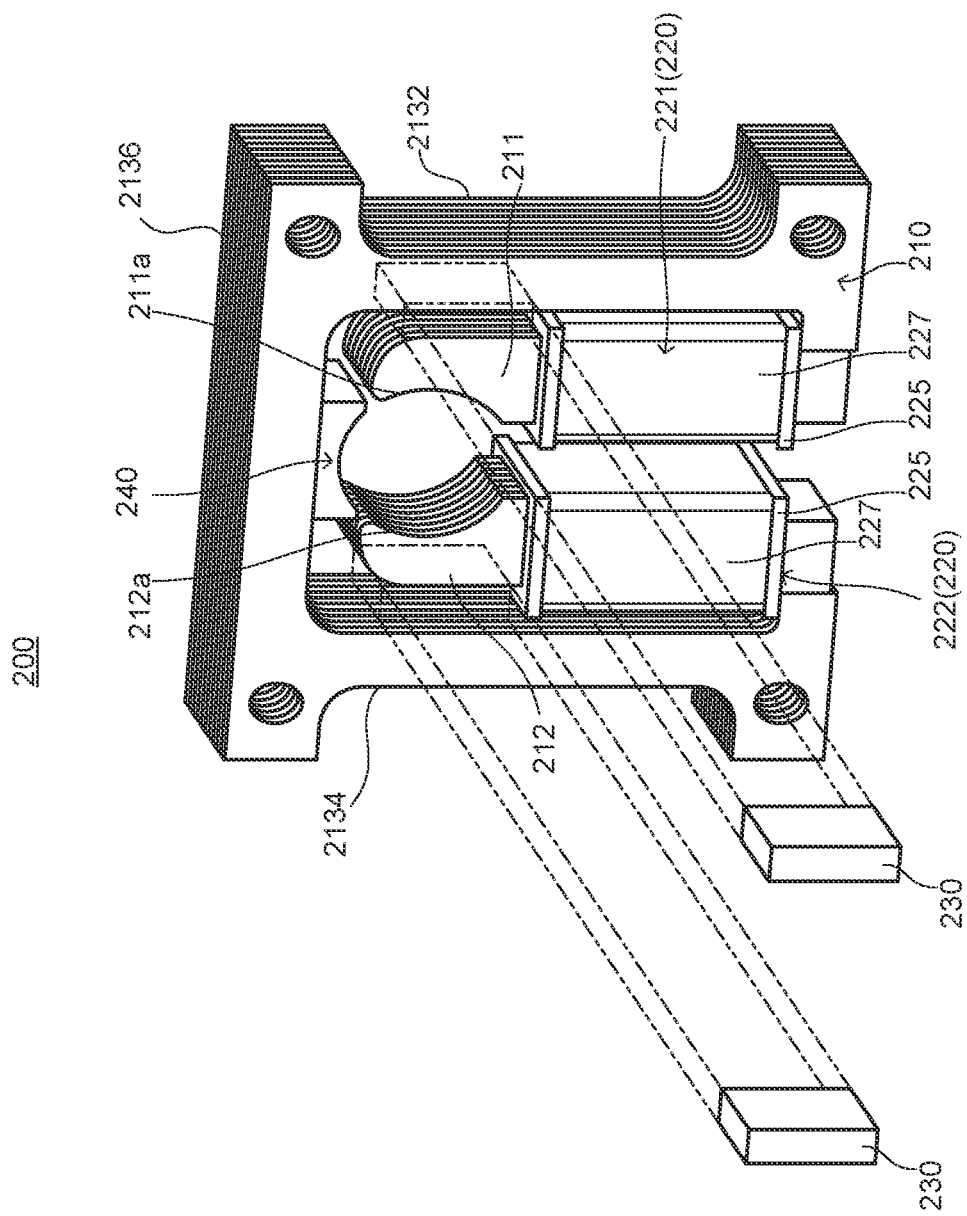
FIG. 4 is a perspective view showing a configuration of the drive unit.

Drive unit 200 has core body 210 and coil bodies 220, as shown in FIGS. 2 and 3. FIG. 4 is a perspective view showing a configuration of the drive unit. Drive unit 200 is formed in a shape of a rectangular plate in the present embodiment.

Coil body 220 has bobbin 225 attached to core body 210, and coil 227 wound around bobbin 225, as shown in FIGS. 2 to 4. By winding coil 227 around bobbin 225, a rectangular cylindrical coil body 220 is formed and is disposed to surround a part of core body 210. Coil body 220 has first coil 221 and second coil 222 configured by winding coil 227 around bobbin 225 in the present embodiment.

In core body 210, one end portion and the other end portion to be magnetic poles 211a and 212a excited by coil bodies 220 are disposed so as to sandwich movable magnet 161 and face each other. In core body 210, a portion continuous between the one end portion and the other end portion to be magnetic poles 211a and 212a is configured to surround magnetic pole 211a as the one end portion and magnetic pole 212a as the other end portion. Core body 210 is formed to surround magnetic poles 211a and 212a as an even number of core magnetic poles, and has a shape continuous between magnetic poles 211a and 212a.

Core body 210 includes first core body 211, second core body 212 and connecting core 213. Coil body 220 is mounted such that each of first core body 211 and second core body 212 of core body 210 is inserted into thereof in the present embodiment. First core body 211 and second core body 212 are integrally connected by connecting core 213. When the coils of coil bodies 220 are energized, core body 210 is excited.

Core body 210 and coil bodies 220 are fixed to wall part 111a of base part 110 via fastening members 251.

In core body 210, each of first core body 211, second core body 212, and connecting core 213 is a stacked core, and configured by stacked silicon steel plates, for example.

First core body 211 and second core body 212 include magnetic poles 211a and 212a, and rod-shaped core portions 211b and 212b. Magnetic poles 211a and 212a are formed to sandwich movable magnet 161. Core portions 211b and 212b are disposed to be parallel each other, and magnetic poles 211a and 212a are one end portions of core portions 211b and 212b, respectively.

Other end portions 211c and 212c of core portions 211b and 212b are connected to connecting core 213. First core body 211 and second core body 212 are formed together with connecting core 213 as an integral structure.

Magnetic poles 211a and 212a are disposed to face each other such that movable magnet 161 is sandwiched therebetween in a direction orthogonal to a shaft of movable magnet 161. Magnetic poles 211a and 212a have curved surfaces that are curved in a direction along the rotational direction of movable magnet 161.

Core portions 211b and 212b of first core body 211 and second core body 212 are disposed to extend from respective magnetic poles 211a and 212a in a direction orthogonal to both a direction where magnetic poles 211a and 212a are faced and a direction where shaft part 141 is extended.

Coil body 220 is disposed around outside of core portions 211b and 212b, respectively. Specifically, first coil 221 and second coil 222 are respectively disposed around outside of core portions 211b and 212b. Winding directions of coil wires of these first coil 221 and second coil 222 are set so that the magnetic flux flows suitably from one of magnetic poles 211a and 212a to the other when a current is supplied to coil wires.

The other end portion of first core body 211 is connected to one end portion of first side portion 2132 in connecting core 213 disposed to be parallel to first core body 211.

The other end portion of second core body 212 is connected to one end portion of second side portion 2134 in connecting core 213 disposed to be parallel to second core body 212.

Connecting core 213 is formed to surround movable magnet 161 and magnetic poles 211a, 212a.

Connecting core 213 is formed in a U-shape in which first core body 211 and second core body 212 are disposed inside thereof in the present embodiment. Connecting core 213 connects between magnetic poles 211a and 212a.

Specifically, connecting core 213 is disposed to surround first coil 221 and second coil 222 from three sides orthogonal to shaft part 141 in addition to magnetic pole 211a of first core body 211 and magnetic pole 212a of second core body 212 which face each other. Connecting core 213 covers magnetic pole 211a, magnetic pole 212a, first coil 221, and second coil 222 from the remaining one side orthogonal to shaft part 141, together with other end portions 211c and 212c of first core body 211 and second core body 212.

Connecting core 213 has first side portion 2132, second side portion 2134, and third side portion 2136 which connects between first side portion 2132 and second side portion 2134. Connecting core 213 integrally includes first side portion 2132, second side portion 2134, and third side portion 2136. Connecting core 213 is formed by stacking magnetic materials as well as first core body 211 and second core body 212. Connecting core 213 is a stacked body in which a thickness thereof is thicker than that of first core body 211 and second core body 212. Connecting core 213 corresponds to a core outer periphery portion which is a portion surrounding around magnetic poles 211a and 212a in core body 210.

Third side portion 2136 links the other end portion of first side portion 2132 and the other end portion of second side portion 2134 to connect both at the shortest distance. Although connecting core 213 has protruding portions, for fixing, protruding in a direction extending third side portion 2136 from corner portions where first side portion 2132 and second side portion 2134 are jointed to both end portions of third side portion 2136, connecting core 213 is formed in the U-shape as a whole.

Third side portion 2136 is a rectangular-shaped body. Third side portion 2136 is disposed to extend in a direction where first core body 211 and second core body 212 are faced, that is, in the direction where magnetic poles 211a and 212a are faced and orthogonal to the shaft of movable magnet 161.

As shown in FIGS. 1 to 4, drive unit 200 has magnet position holding part 240 in the present embodiment.

Thus, drive unit 200 is configured of first core body 211 and second core body 212 to which first coil 221 and second coil 222 are assembled respectively, and U-shaped connecting core 213 including first side portion 2132, second side portion 2134, and third side portion 2136. Specifically, core body 210 has first core body 211 and second core body 212 each having a rod-shape and including magnetic poles 211a and 212a at respective tip portions, are inserted into coil bodies 220 respectively. Core body 210 has connecting core 213 connecting between first core body 211 and second core body 212. First core body 211 and second core body 212 are disposed in parallel so that magnetic poles 211a and 212a are faced. Connecting core 213 is formed in the U-shape to surround first core body 211 and second core body 212. Connecting core 213 is disposed to surround first core body 211 and second core body 212 and both end portions thereof are jointed to each of base end portions of first core body 211 and second core body 212. Thus, it is possible to minimize the number of components in the core, reduce cost, and improve ease of assembly.

Magnet position holding part 240 is made of a magnet. Magnet position holding part 240 functions as a magnetic spring together with movable magnet 161 by the magnetic attraction force generated between it and movable magnet 161. The magnetic spring rotatably holds the movable body including movable magnet 161, shaft part 141 and other portions so that the movable body is positioned at the movement reference position in a normal state. Here, the normal state is a state where coil bodies 220 are not energized. Magnet position holding part 240 magnetically attracts movable magnet 161 by the magnetic spring so that rotatable movable magnet 161 is positioned at the movement reference position.

The movement reference position at which magnet position holding part 240 magnetically attracts movable magnet 161 is a rotational center position of rotary reciprocation of movable magnet 161. When the movable body is positioned at the movement reference position, magnetic pole switching portions 161c of movable magnet 161 are positioned at positions facing the magnetic poles of coil bodies 220 side.

Magnet position holding part 240 is attached to third side portion 2136 so as to project to movable magnet 161 side, and disposed to face movable magnet 161 with air gap G therebetween.

Figure 6:
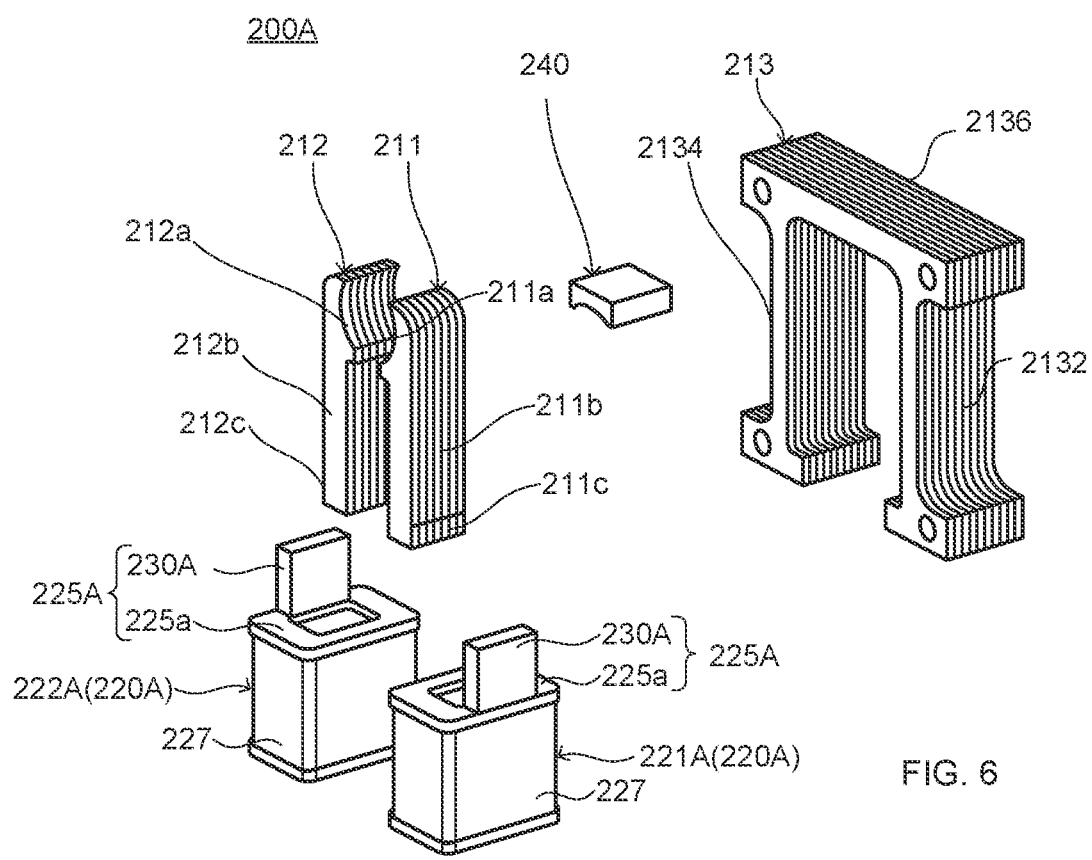
FIG. 6 is an exploded perspective view of the modification of the drive unit.

Magnet position holding part 240 is, for example, a magnet whose facing surface is magnetized to the N-pole (see FIG. 6). Magnet position holding part 240 may be formed integrally with third side portion 2136. Magnet position holding part 240 positions movable magnet 161 at the movement reference position and holds it at this position.

Magnet position holding part 240 is a magnet magnetized toward movable magnet 161. Magnet position holding part 240 locates magnetic pole switching portions 161c of movable magnet 161 at positions facing magnetic poles 211a and 212a when movable magnet 161 is positioned at the movement reference position (the neutral position). In other words, magnetic pole switching portions 161c, which are positions of switching of the magnetic poles of the even number of magnetic poles 161a and 161b, position on the same radius of an axis centered on shaft part 141 with respect to centers of lengths in a circumferential direction around an axis of magnetic poles 211a and 212a. Thus, the even number of magnetic poles 161a and 161b becomes a state to be a position capable of rotating similarly in both one direction and the other direction around the shaft with respect to magnetic poles 211a and 212a.

As described above, magnet position holding part 240 and movable magnet 161 are attracted to each other, and magnet position holding part 240 can position movable magnet 161 at the movement reference position. Thus, magnetic pole switching portions 161c of movable magnet 161 face magnetic pole 211a of first core body 211 and magnetic pole 212a of second core body 212. At this position, drive unit 200 generates the maximum torque to stably drive the movable body. Since movable magnet 161 is magnetized with two poles, the movable object can be easily driven at a high amplitude and vibration performance can be improved by cooperation with core body 210.

Further, as shown in FIGS. 2 to 4, drive unit 200 has spacer parts 230 in the present embodiment. Spacer parts 230 fix magnetic poles 211a and 212a to first side portion 2132 and second side portion 2134 close to each of magnetic poles 211a and 212a. Further, spacer parts 230 has a function to suitably flow the magnetic flux between magnetic poles 211a and 212a in core body 210 through core body 210 between magnetic poles 211a and 212a.

Spacer parts 230 are respectively sandwiched between first core body 211 and first side portion 2132 and between second core body 212 and second side portion 2134 which are disposed side by side next to each other, and are provided to be fixed thereto. Spacer parts 230 can increase a rigidity of core body 210 itself by fixing first side portion 2132 and second side portion 2134 to magnetic poles 211a and 212a via spacer parts 230. Thus, deformation or breakage of magnetic poles 211a and 212a due to magnetic attraction with movable magnet 161 or impact can be suppressed.

Spacer parts 230 fix magnetic pole 211a, which is a free end in first core body 211, to first side portion 2132 of connecting core 213, and fix magnetic pole 212a, which is a free end in second core body 212, to second side portion 2134 of connecting core 213.

Further, spacer parts 230 regulate flowing the magnetic flux in a direction where first core body 211 and first side portion 2132 are faced, that is, in a direction different from a magnetic path by core body 210. Further, spacer parts 230 regulate flowing the magnetic flux in a direction where second core body 212 and second side portion 2134 are faced, that is, in a direction different from a direction where second core body 212 and second side portion 2134 are continuous with each other (a direction where the magnetic flux flows) as the magnetic path by core body 210.

Spacer parts 230 are preferable to be a non-magnetic material that is not attracted to a magnet, and preferable to be made of brass or aluminum, for example.

For example, spacer part 230 is disposed to be sandwiched between first core body 211 and first side portion 2132 which are disposed side by side next to each other, and fix to both first core body 211 and first side portion 2132 by adhesion, welding and others. Thus, spacer parts 230 can be fixed to core body 210 more firmly by making a material thereof a non-magnetic and weldable member such as brass or aluminum.

Spacer parts 230 may be components that are fixed by adhesion to at least one of first core body 211 and first side portion 2132 or at least one of second core body 212 and second side portion 2134 which are adjacent to each other. For example, spacer parts 230 may be integrally provided with first coil 221 and second coil 222 which constitute coil bodies 220 in drive unit 200. For example, spacer part 230 may be fixed by being simply disposed to be sandwiched between first core body 211 and first side portion 2132 which are disposed side by side next to each other.

Figure 5:
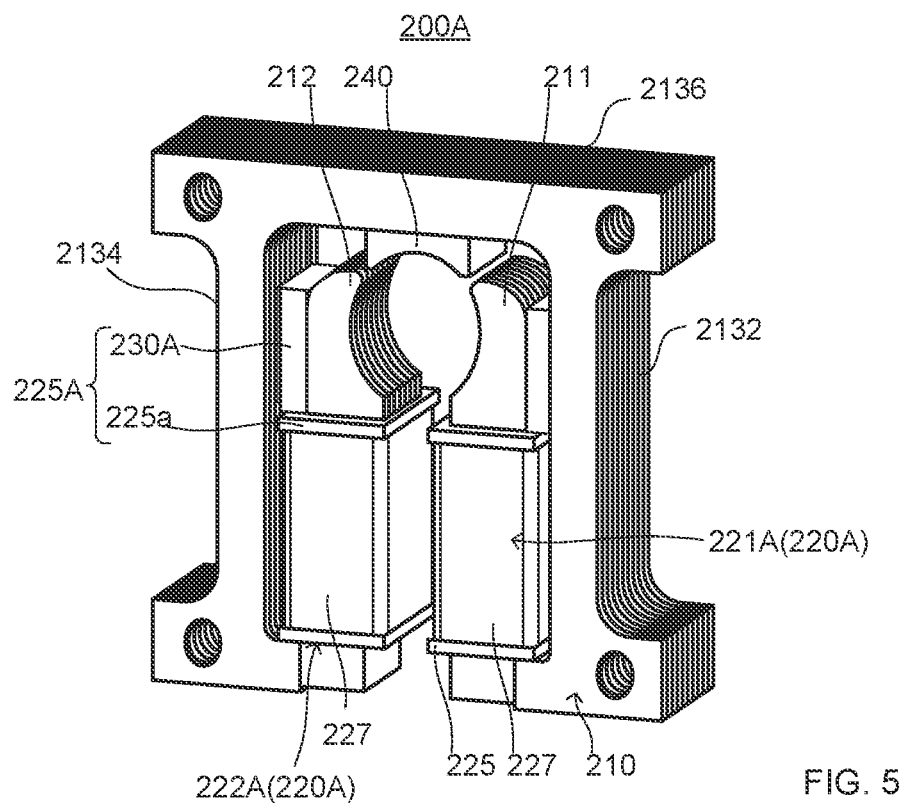
FIG. 5 is a view for explaining a modification of the drive unit.

In drive unit 200A shown in FIGS. 5 and 6, each of spacer parts 230A is integrally provided with each of bobbins 225 that comprise first coil 221A and second coil 222A.

Spacer parts 230A are provided so as to be positions where spacer parts 230A overlap back sides of magnetic poles 211a and 212a when first coil 221A and second coil 222A are respectively assembled to first core body 211 and second core body 212. For example, spacer parts 230A are integrally formed with bobbins 225a, as bobbin body 225A using resin and others. Note that, compared with drive unit 200, drive unit 200A differs only in configurations of spacer parts 230A, first coil 221A, and second coil 222A, but the other configurations are the same. Therefore, only different components compared with drive unit 200 will be described, and similar components will be omitted.

As described above, spacer parts 230A are respectively disposed between first core body 211A and first side portion 2132 and between second core body 212A and second side portion 2134 by simply assembling first coil 221A and second coil 222A as coil bodies 220A to core body 210. Thus, a number of parts can be reduced as well as a fixing strength of magnetic poles 211a and 212a can be increased by integrating spacer parts 230A and bobbin 225.

<Operation of Rotary Reciprocating Drive Actuator 100>

Figure 7:
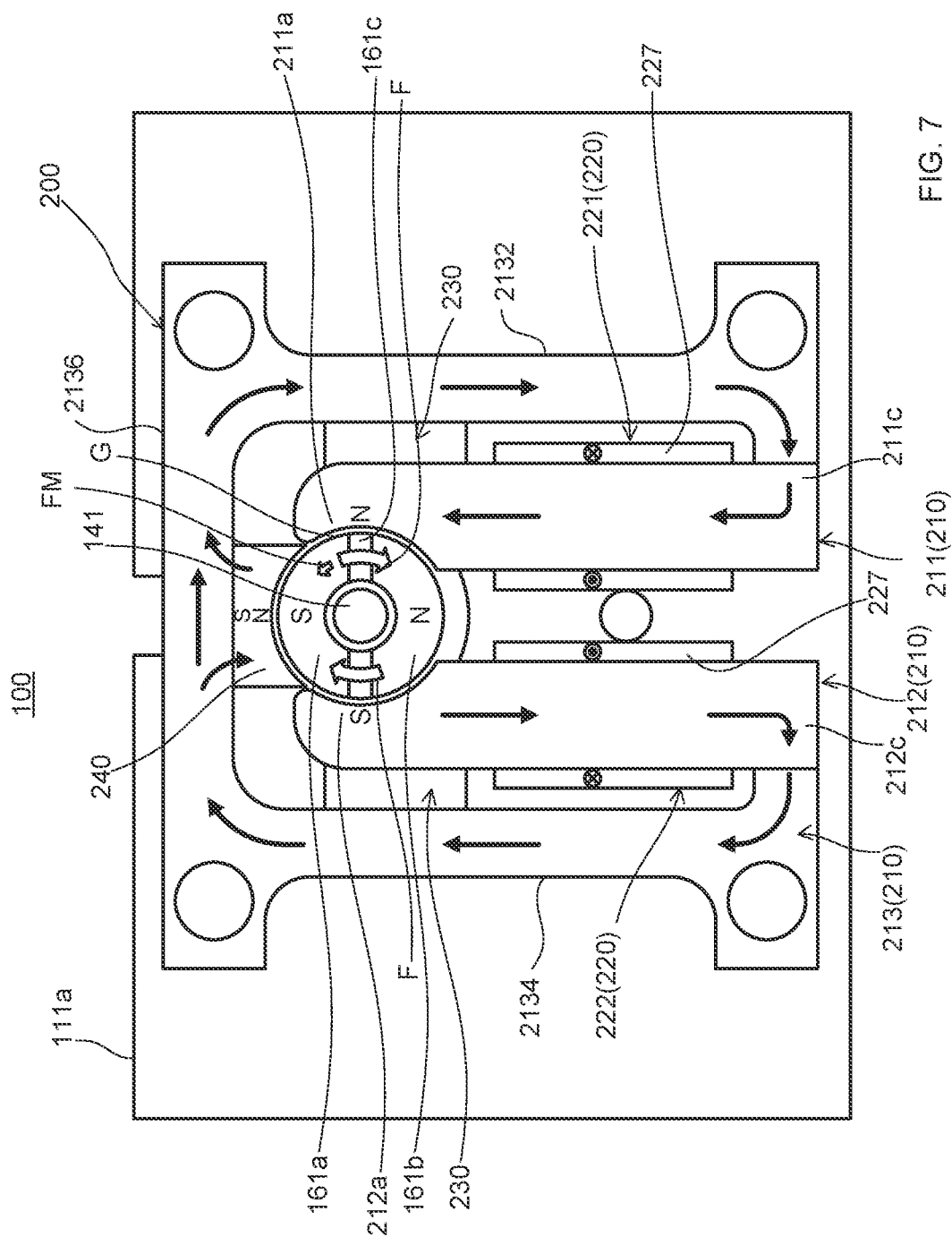
FIG. 7 is a view for explaining an operation of a magnetic circuit of the rotary reciprocating drive actuator.
Figure 8:
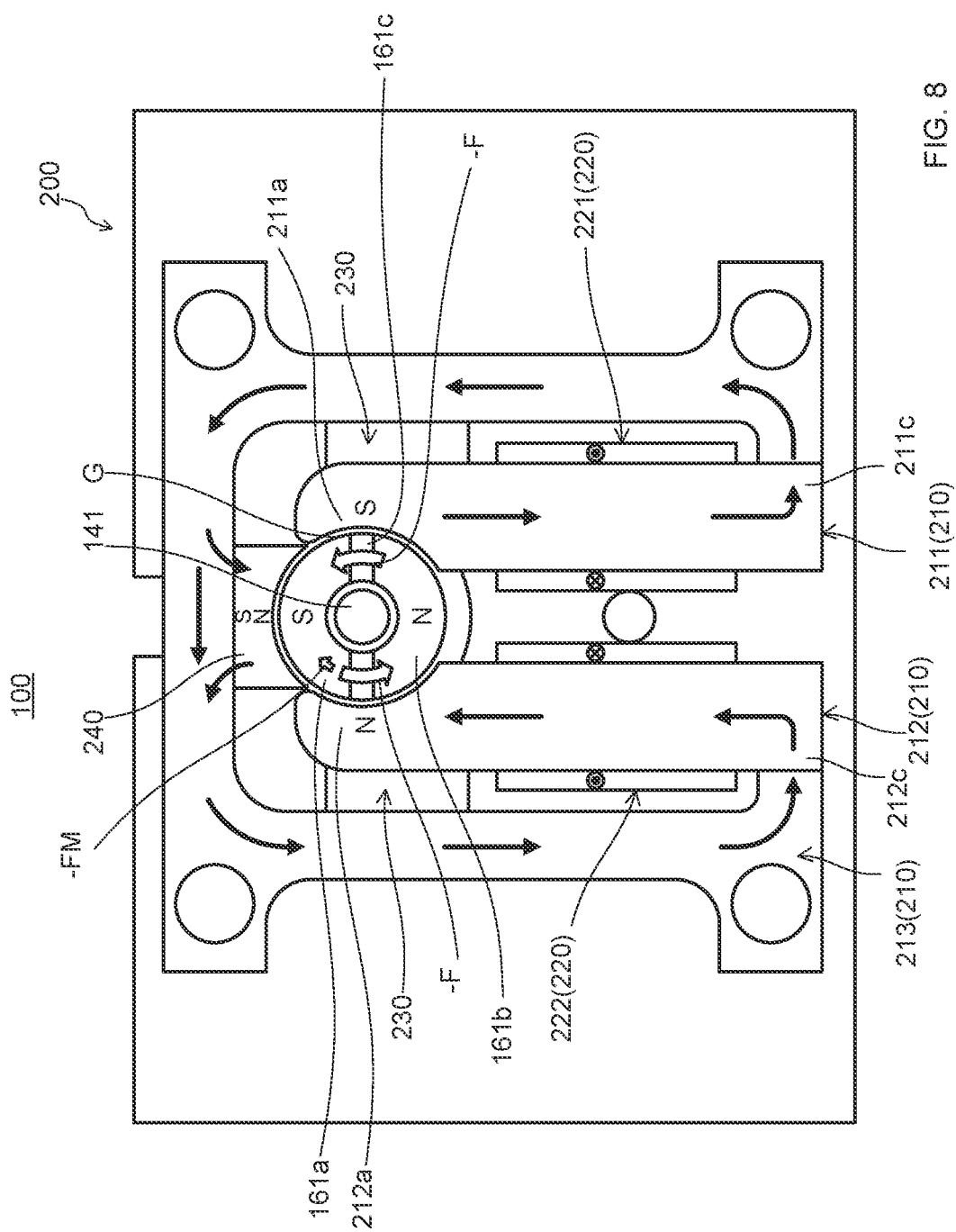
FIG. 8 is a view for explaining the operation of the magnetic circuit of the rotary reciprocating drive actuator.

Next, an operation of rotary reciprocating drive actuator 100 will be described with reference to FIGS. 7 and 8 in addition to FIG. 3. FIGS. 7 and 8 are views for explaining an operation of a magnetic circuit of rotary reciprocating drive actuator 100.

Two magnetic poles 211a and 212b are disposed to face each other so as to sandwich movable magnet 161 with air gap G between them and the outer periphery of movable magnet 161.

As shown in FIG. 3, when coil bodies 220 (221, 222) are not energized, movable magnet 161 is positioned at the movement reference position by the magnetic attraction force between magnet position holding part 240 and movable magnet 161, that is, the magnetic spring.

In this movement reference position (the movement reference position may be referred to as a normal state in the present invention), one of magnetic poles 161a and 161b of movable magnet 161 is attracted to magnet position holding part 240, and magnetic pole switching portions 161c are positioned at positions facing the center positions of magnetic pole 211a of first core body 211 and magnetic pole 212a of second core body 212.

When coil bodies 220 are energized, coil bodies 220 (221, 222) excite first core body 211 and second core body 212.

When coil bodies 220 are energized in the direction shown in FIG. 7, magnetic pole 211a is magnetized to the N-pole, and magnetic pole 212a is magnetized to the S-pole.

As a result, in first core body 211, the magnetic flux is formed in which the magnetic flux is emitted from magnetic pole 211a magnetized to the N-pole to movable magnet 161, flows through movable magnet 161, magnet position holding part 240, and connecting core 213 (third side portion 2136) in this order, and enters into core portion 211b.

In second core body 212, the magnetic flux is emitted from core portion 212b to connecting core 213 (second side portion 2136) side, flows through connecting core 213, magnet position holding part 240, and movable magnet 161 in this order, and enters magnetic pole 212a.

Thus, magnetic pole 211a magnetized to the N-pole is attracted to the S-pole in movable magnet 161, magnetic pole 212a magnetized to the S-pole is attracted to N-pole in movable magnet 161, a torque in the F direction is generated around the axis of shaft part 141 in movable magnet 161, and movable magnet 161 rotates in the F direction. Accordingly, shaft part 141 also rotates, and mirror part 120 fixed to shaft part 141 also rotates.

Next, as shown in FIG. 8, when the energization direction of coil bodies 220 are switched to the opposite direction, magnetic pole 211a is magnetized to the S-pole, magnetic pole 212a is magnetized to the N-pole, and the flow of the magnetic flux is also reversed.

Thus, magnetic pole 211a magnetized to the S-pole is attracted to the N-pole in movable magnet 161, magnetic pole 212a magnetized to the N-pole is attracted to the S-pole in movable magnet 161, a torque in the direction opposite to the F direction is generated around the axis of shaft part 141 in movable magnet 161, and movable magnet 161 rotates in the direction opposite to the F direction. Accordingly, shaft part 141 also rotates in the opposite direction, and mirror part 120 fixed to shaft part 141 also rotates in the opposite direction. By repeating these motions, rotary reciprocating drive actuator 100 drives mirror part 120 in the rotary reciprocating manner.

Figure 12:
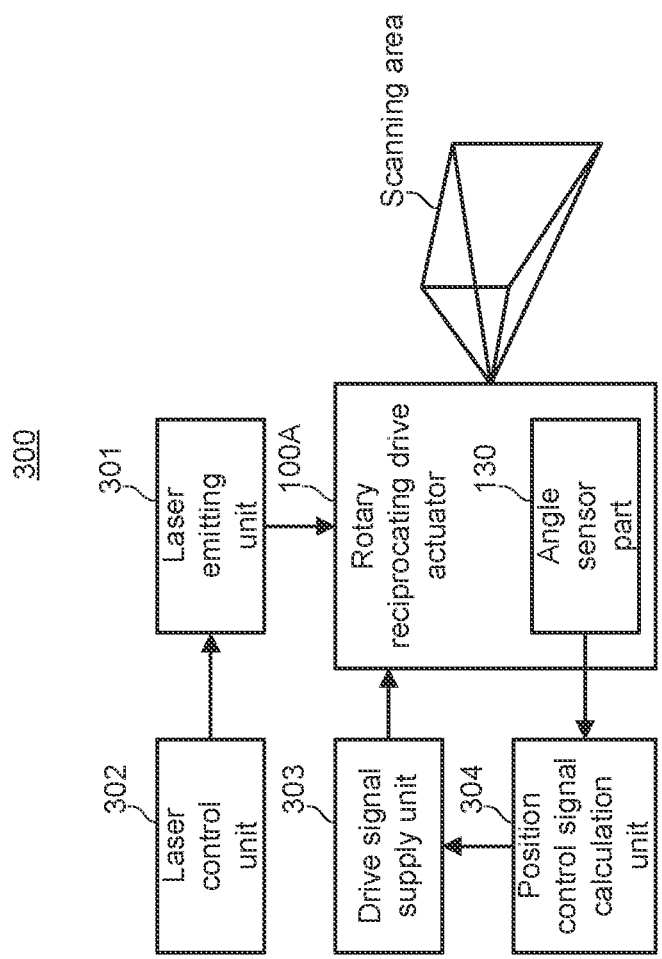
FIG. 12 is a block diagram showing a configuration of a main part of an optical scanner device as an example using the rotary reciprocating drive actuator according to the Modification 1.

In practice, rotary reciprocating drive actuator 100 is driven by an alternating current wave input from a power supply unit (for example, corresponding to drive signal supply unit 303 in FIG. 12) to coil bodies 220. That is, the energization directions of coil bodies 220 are periodically switched, and the torque in the F direction around the axis and the torque in the direction opposite to the F direction (−F direction) alternately act on the movable body. Thus, the movable body is driven in the rotary reciprocating manner.

Incidentally, at the time of switching the energization direction, the magnetic attraction force between magnet position holding part 240 and movable magnet 161 is generated, that is, magnetic spring torque FM (FIG. 7) or −FM (FIG. 8) is generated by the magnetic spring, and movable magnet 161 is urged to the movement reference position.

The driving principle of rotary reciprocating drive actuator 100 will be briefly described below. In rotary reciprocating drive actuator 100 of the present embodiment, when the moment of inertia of the movable body is J [kg·m²] and the spring constant in the torsional direction of the magnetic spring (magnetic poles 211a and 212a, magnet position holding part 240, and movable magnet 161) is $K_{sp}$, the movable body vibrates (rotary reciprocates) with respect to base part 110 at a resonance frequency $F_r$ [Hz] calculated by the equation (1).

[Equation 1]

$$F_r = \frac{1}{2\pi}\sqrt{\frac{K_{sp}}{J}} \quad (1)$$

$F_r$: Resonance frequency [Hz]
J: Moment of inertia [kg·m²]
$K_{sp}$: Spring constant [N·m/rad]

Since the movable body constitutes a mass portion in a vibration model of a spring—mass system, when an alternating current wave having a frequency equal to the resonance frequency $F_r$ of the movable body is inputted to coil bodies 220, the movable body enters a resonance state. That is, by inputting the alternating current wave having a frequency substantially equal to the resonance frequency $F_r$ of the movable body to coil bodies 220 from the power supply unit, the movable body can be efficiently vibrated.

A motion equation and a circuit equation showing the driving principle of rotary reciprocating drive actuator 100 are shown below. Rotary reciprocating drive actuator 100 is driven based on the motion equation expressed by the equation (2) and the circuit equation expressed by the equation (3).

[Equation 2]

$$J\frac{d^2\theta(t)}{dt^2} = K_t i(t) - K_{sp}\theta(t) - D\frac{d\theta(t)}{dt} - T_{Loss} \quad (2)$$

J: Moment of inertia [kg·m²]
θ(t): Rotation angle [rad]
$K_t$: Torque constant [N·m/A]
i(t): Current [A]
$K_{sp}$: Spring constant [N·m/rad]
D: Damping coefficient [N·m/(rad/s)]
$T_{Loss}$: Load torque [N·m]

[Equation 3]

$$e(t) = Ri(t) + L\frac{di(t)}{dt} + K_e\frac{d\theta(t)}{dt} \quad (3)$$

e(t): Voltage [V]
R: Resistance [Ω]
L: Inductance [H]
$K_e$: Counter electromotive force constant [V/(rad/s)]

That is, the moment of inertia J [kg·m²], the rotation angle θ(t) [rad], the torque constant $K_t$ [N·m/A], the current I(t) [A], the spring constant $K_{sp}$ [N·m/rad], the damping coefficient D [N·m/(rad/s)], the load torque $T_{Loss}$ [N·m], and the like of the movable body in rotary reciprocating drive actuator 100 can be appropriately changed within the range satisfying the equation (2). Further, the voltage e(t) [V], the resistance R [Ω], the inductance L [H], and the counter electromotive force constant $K_e$ [V/(rad/s)] can be appropriately changed within the range satisfying the equation (3).

Thus, rotary reciprocating drive actuator 100 can obtain an efficient and large vibration output when the coil is energized by the alternating current wave corresponding to the resonance frequency $F_r$ determined by the moment of inertia J of the movable body and the spring constant $K_{sp}$ of the magnetic spring.

According to rotary reciprocating drive actuator 100 of the present embodiment, since a torque generation efficiency is high, heat is hard to transfer to mirror 124 which is the movable object, and as a result, a flatness of a reflection surface of mirror 124 can be ensured with high accuracy. Further, a manufacturing efficiency is high, an assembly accuracy is good, and even if the movable object is a large sized mirror, it can be driven at a high amplitude.

Further, according to rotary reciprocating drive actuator 100, mirror part 120 disposed between the pair of wall parts 111a and 111b of base part 110 via shaft part 141 is supported to be able to move in the rotary reciprocating manner by drive unit 200 at one side of shaft part 141.

Thus, rotary reciprocating drive actuator 100 itself can be reduced in size according to a size of mirror part 120 to be the movable object, and an arrangement space thereof can be used efficiently even in a small arrangement space. Further, since drive unit 200 is disposed only one side of the pair of wall parts 111a and 111b which sandwich mirror part 120, wiring of coil 227 and others can be simplified.

<Modification 1>

Figure 9:
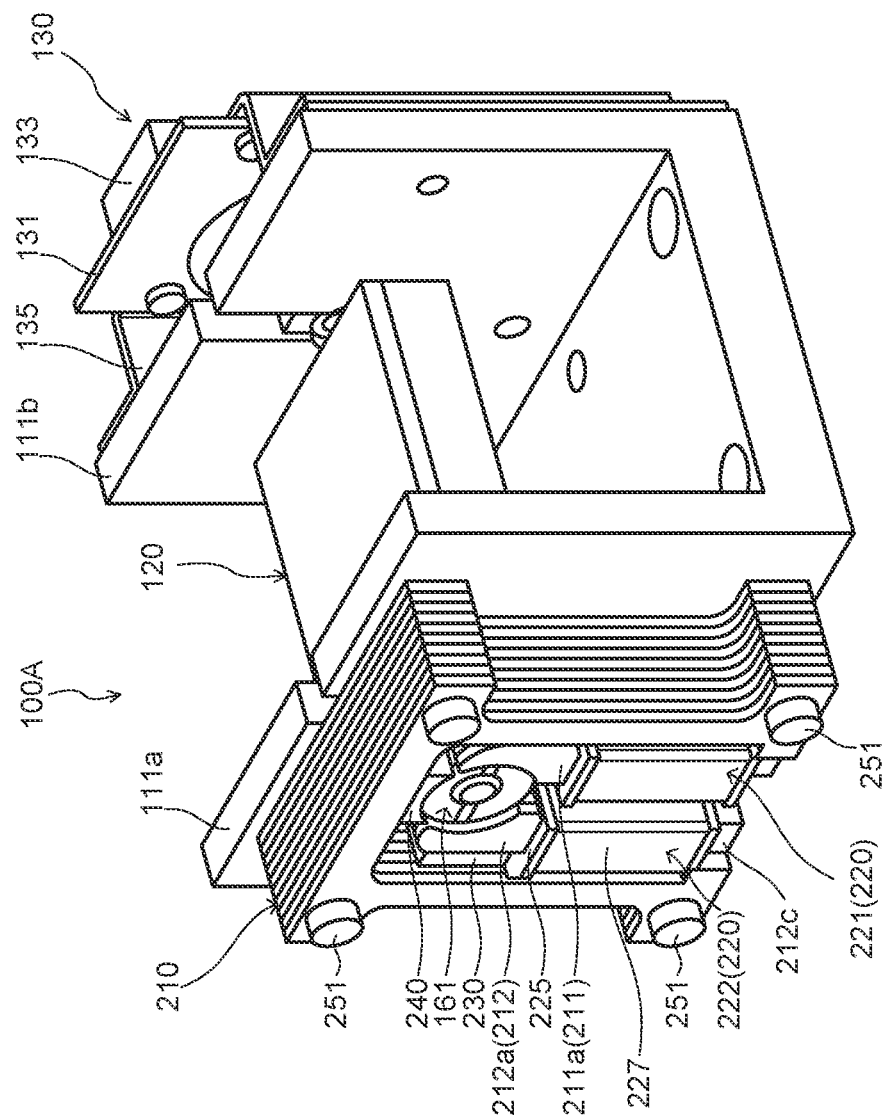
FIG. 9 is an external perspective view of the rotary reciprocating drive actuator according to Modification 1 of the embodiment.
Figure 10:
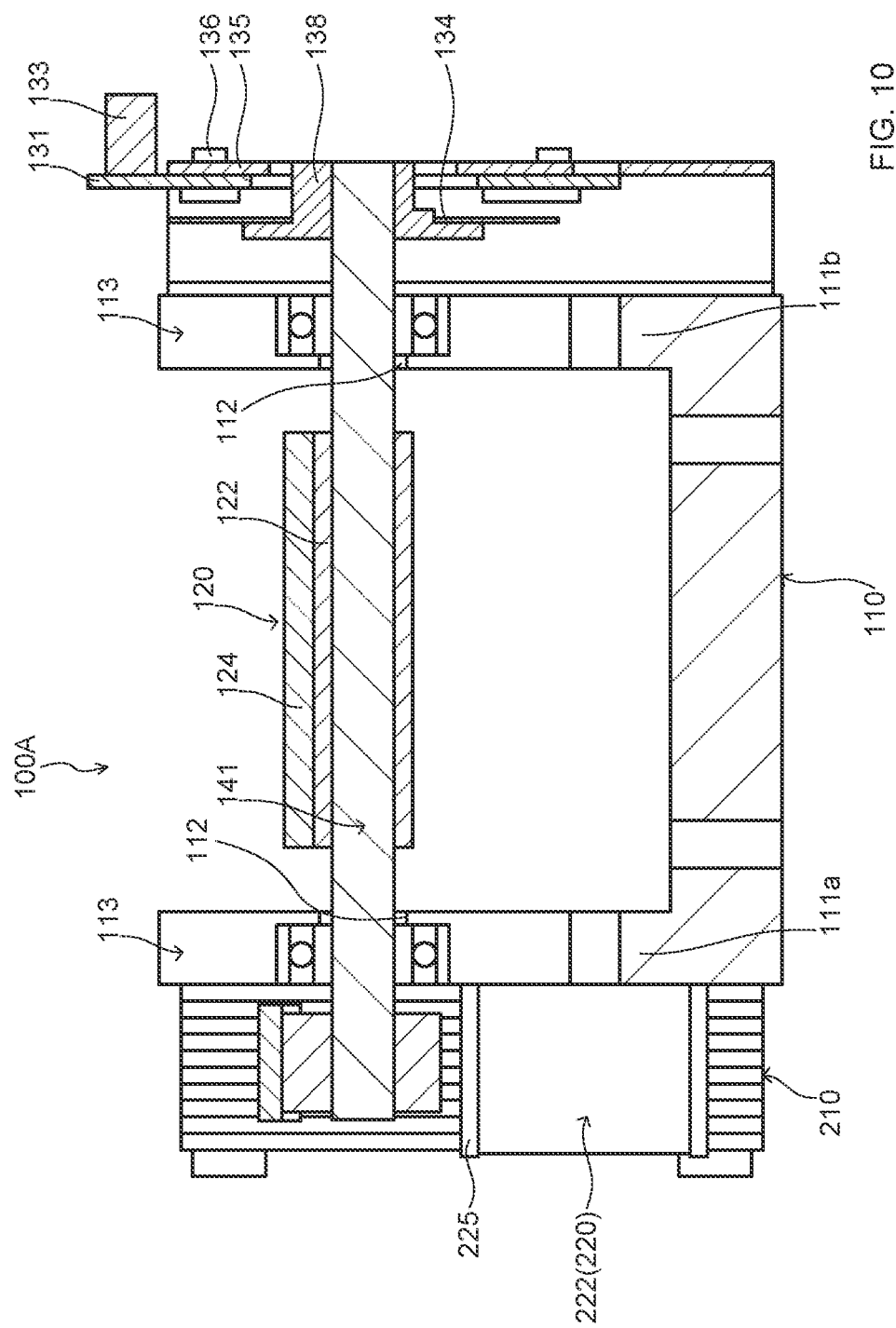
FIG. 10 is a longitudinal sectional view showing a configuration of a main part of the rotary reciprocating drive actuator according to the Modification 1.
Figure 11:
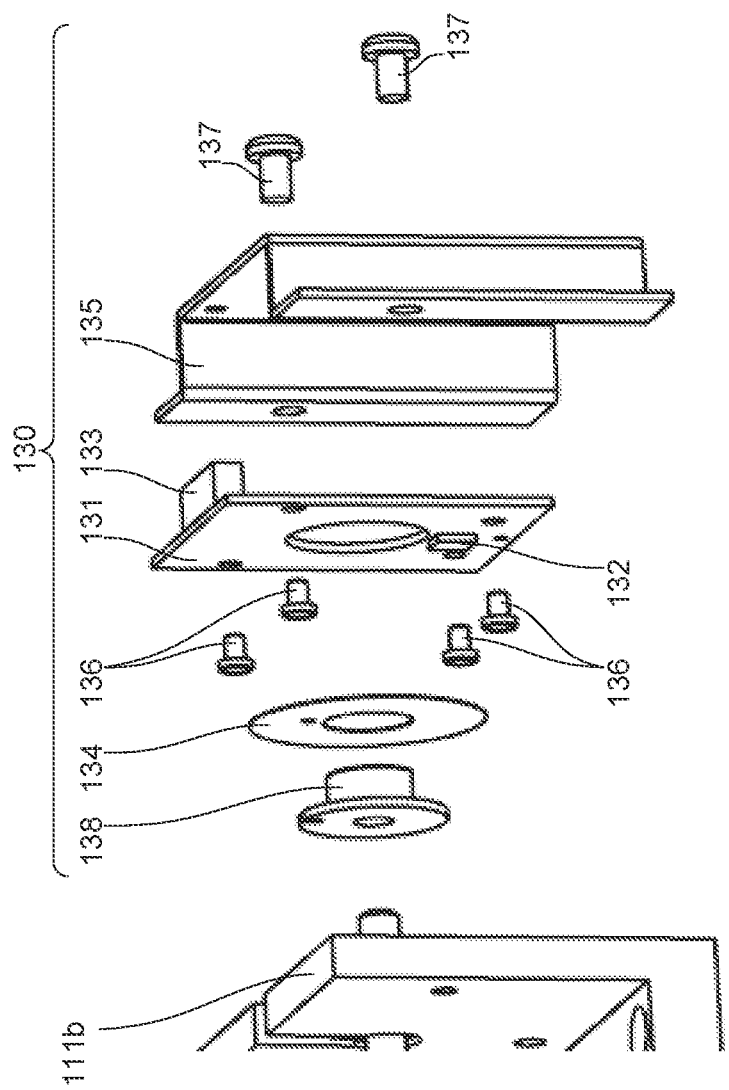
FIG. 11 is an exploded perspective view showing an angle sensor part of the rotary reciprocating drive actuator according to the Modification 1.

FIGS. 9 to 11 are views for explaining rotary reciprocating drive actuator 100A according to Modification 1 of the rotary reciprocating drive actuator. FIG. 9 is an external perspective view of rotary reciprocating drive actuator 100A according to Modification 1, FIG. 10 is a longitudinal sectional view showing a configuration of a main part of rotary reciprocating drive actuator 100A. FIG. 11 is an exploded perspective view showing angle sensor part 130 of rotary reciprocating drive actuator 100A.

Rotary reciprocating drive actuator 100A is provided with angle sensor part 130 to the configuration of rotary reciprocating drive actuator.

Angle sensor part 130 is for detecting a rotation angle of shaft part 141, and attached to wall part 111b side, to which drive unit 200 is not attached, in the pair of wall parts 111a and 111b of base part 110.

Note that a configuration of rotary reciprocating drive actuator 100A is the same as the configuration of rotary reciprocating drive actuator 100 except including angle sensor part 130. Therefore, angle sensor part 130 is mainly explained in the following description of rotary reciprocating drive actuator 100A, and the other components, that is, components similar to the components of rotary reciprocating drive actuator 100, are omitted.

Angle sensor part 130 has circuit board 131; optical sensor 132 and connector 133 mounted on circuit board 131; encoder disk 134; and case 135. Circuit board 131 is fixed to case 135 by fastening members 136. Case 135 is fixed to wall part 111b by fastening members 137.

Encoder disk 134 is mounted by fastening to shaft part 141 via mounting member 138, and rotates integrally with movable magnet 161 and mirror part 120. That is, mounting member 138 has an insertion hole through which shaft part 141 is inserted and fastened, and a flange portion to which encoder disk 134 is abutted and fastened, and mounting member 138 is fixed to both shaft part 141 and encoder disk 134. As a result, a rotational position of encoder disk 134 is the same as a rotational position of shaft part 141. Optical sensor 132 emits light to encoder disk 134 and detects the rotational position (angle) of encoder disk 134 based on the reflected light. Thereby, the rotational position of movable magnet 161 and mirror part 120 can be detected by optical sensor 132. Thus, it is possible to detect the rotational position of the movable object including movable magnet 161 and shaft part 141, and it is possible to control an angular position and a speed of movable body, specifically mirror part 120 to be the movable object, during driving.

In rotary reciprocating drive actuator 100A, movable magnet 161 in the movable body and drive unit 200 including coil bodies 220, core body 210, and others are attached to an outer surface side of one wall part 111a of the pair of wall parts 111a and 111b of base part 110. On the other hand, angle sensor part 130 for detecting the rotation angle of shaft part 141 is attached to an outer surface side of the other wall part 111b of the pair of wall parts 111a and 111b of base part 110. This makes it easy to remove angle sensor part 130 and adjust an assembly position thereof. Since angle sensor part 130 can be easily removed, angle sensor part 130 can be easily replaced when a failure occurs in angle sensor part 130.

Further, angle sensor part 130 can be assembled at the final stage of assembly. As a result, the expensive angle sensor part 130 can be assembled after it is confirmed that the assembly of the other components is normal. Therefore, a risk of wasting the expensive angle sensor part 130 due to the assembly failure of the other components can be suppressed. Note that, rotary reciprocating drive actuators 100 and 100A of the present embodiment are used in scanners capable of optical scanning, and can be driven by resonance, but can also be driven by non-resonance.

FIG. 12 is a block diagram showing a configuration of a main part of scanner system using rotary reciprocating drive actuator 100A of Modification 1.

Scanner system 300, as an example of the optical scanner device, has laser emitting unit 301; laser control unit 302; drive signal supply unit 303; and position control signal calculation unit 304 in addition to rotary reciprocating drive actuator 100A.

Laser emitting unit 301 includes, for example, an LD (laser diode) to be a light source; a lens system for converging a laser beam output from the light source, and others. Laser control unit 302 controls laser emitting unit 301. The laser beam obtained by laser emitting unit 301 is incident on mirror 124 of rotary reciprocating drive actuator 100A.

Position control signal calculation unit 304 generates and outputs a drive signal for controlling shaft part 141 (mirror 124) to be the target angular position with reference to the angular position of shaft part 141 (mirror 124) acquired by angle sensor part 130 and the target angular position. For example, position control signal calculation unit 304 generates a position control signal on the basis of the obtained angular position of shaft part 141 (mirror 124) and a signal indicating the target angular position converted using sawtooth waveform data, and the like stored in a waveform memory which is not illustrated, and outputs the position control signal to drive signal supply unit 303.

Based on the position control signal, drive signal supply unit 303 supplies the drive signal to coil bodies 220 of rotary reciprocating drive actuator 100 such that the angular position of shaft part 141 (mirror 124) becomes a desired angular position. Thus, scanner system 300 can emit a scanning light from rotary reciprocating drive actuator 100A to a predetermined scanning area.

<Modification 2>

Figure 13:
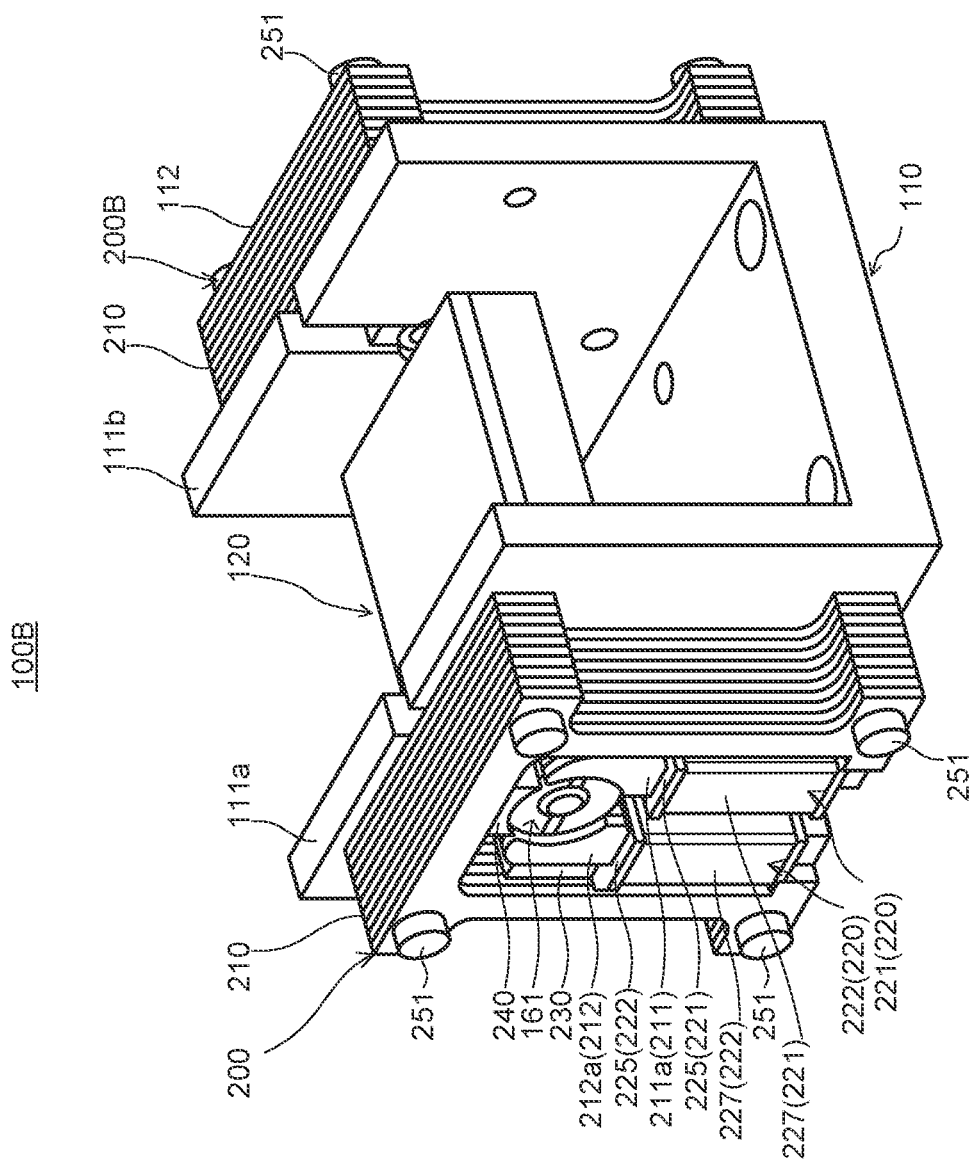
FIG. 13 is an external perspective view showing another exemplary configuration of the rotary reciprocating drive actuator.

FIG. 13 is a perspective view showing rotary reciprocating drive actuator according to Modification 2 of the present embodiment.

Rotary reciprocating drive actuator 100B of Modification 2 is provided with another drive unit 200B configured in the same way as drive unit 200 in addition to the configuration of rotary reciprocating drive actuator 100.

In other words, rotary reciprocating drive actuator 100B has base part 110; mirror part 120 rotatably supported by base part 110 via shaft part 141; and drive units 200 and 200B, disposed both end portion sides of shaft part 141, for driving mirror part 120 in the rotary reciprocating manner.

Movable magnet 161 is attached to the other end portion of shaft part 141 in the same way as the one end portion thereof, and drive unit 200B is provided corresponding to movable magnet 161 in the same way as drive unit 200 at the one end portion of shaft part 141. Note that, drive unit 200B drives in the same rotary reciprocating manner as the rotary reciprocating manner to movable magnet 161 by drive unit 200 to which the current is supplied.

In rotary reciprocating drive actuator 100B, mirror part 120 as the movable object is disposed between the pair of wall parts 111a and 111b via ball bearings 151. It can be said that mirror part 120 is disposed at a position sandwiched by ball bearings 151, and mirror part 120 is held by the pair of wall parts 111a and 111b via ball bearings 151.

Thus, since mirror part 120 to be the movable object is sandwiched by ball bearings 151, it is possible to hold mirror part 120 stably even when mirror part 120 is enlarged, provide excellent impact resistance and vibration resistance, and improve a reliability of driving.

In addition, since mirror part 120 is supported to be able to move in the rotary reciprocating manner by drive units 200 and 200B respectively disposed both sides of shaft part 141 which supports mirror part 120, it is possible to generate larger driving force than that by a configuration whose drive units 200 and 200B are provided at one side.

SUMMARY

As described above, rotary reciprocating drive actuator 100 of the present embodiment includes base part 110; movable magnet 161 fixed to shaft part 141 to which the movable object (mirror part 120 in the example of the embodiment) is connected; and drive unit 200 including core body 210 and coil bodies 220 for generating the magnetic flux in core body 210 when the current is supplied, and driving movable magnet 161 in a rotary reciprocating manner by the electromagnetic interaction between the magnetic flux generated from core body 210 and movable magnet 161.

Further, in rotary reciprocating drive actuator 100, movable magnet 161 is formed in the ring shape, and is configured by alternately magnetizing the even number of magnetic poles forming the S-pole and the N-pole at the outer periphery of shaft part 141. The number of magnetic poles of core body 210 and the number of magnetic poles of movable magnet 161 are equal to each other; the even number of magnetic poles of core body 210 is respectively arranged to face movable magnet 161 with the air gap therebetween on the outer peripheral side of shaft part 141. Drive unit 200 is provided with magnet position holding part 240 which is a magnetic material provided to face movable magnet 161 and magnetically attracts movable magnet 161 to a reference position.

Thus, since movable magnet 161 is magnetically attracted to the neutral position (movement reference position) by magnet position holding part 240 every time the energization direction is switched, good energy efficiency, good responsiveness, and high amplitude rotary reciprocating drive are realized. Further, compared with the rotary reciprocating drive actuator of the coil movable type, the heat generated by coil bodies 220 is hard to transfer to the movable object, and when the movable object is a mirror, it is possible to prevent adverse effects (bond deterioration, warpage, etc.) of the heat from affecting the mirror.

In core body 210 of drive unit 200, magnetic poles 211a and 212a are disposed to face each other with sandwiching movable magnet 161. First coil 221 and second coil 222 are disposed around outside of core body 210 with adjacent to each of magnetic poles 211a and 212a. Further, other end portions 211c and 212c of first core body 211 and second core body 212 to which first coil 221 and second coil 222 are attached are connected to connecting core 213. Connecting core 213 is disposed to surround first coil 221, second coil 222, magnetic poles 211a, 212a, and movable magnet 161 in the direction orthogonal to shaft part 141. Core body 210 is formed to surround magnetic poles 211a and 212a as an even number of core magnetic poles, and has a shape continuous between magnetic poles 211a and 212a.

In core body 210, for example, magnetic poles 211a and 212a sandwich movable magnet 161 in the direction orthogonal to shaft part 141. Further, first coil 221 and second coil 222 are disposed adjacent to magnetic poles 211a and 212a, and extended in the direction orthogonal to shaft part 141 and the direction where magnetic poles 211a and 212a are faced. Magnetic poles 211a, 212a, first coil 221 and second coil 222 are surrounded by first side portion 2132, second side portion 2134, third side portion 2136, portions to where other end portions 211c, 212c are connected in connecting core 213, and other end portions 211c, 212c in the direction orthogonal to shaft part 141.

In core body 210, coil bodies 220 (first coil 221 and second coil 222) are disposed adjacent or close to magnetic poles 211a and 212a, and the magnetic circuit communicating magnetic poles 211a and 212a is formed at the shortest distance to surround them.

Thus, it is possible to improve the electromagnetic conversion efficiency in the magnetic circuit and improve the output.

In addition, in rotary reciprocating drive actuator 100 of the present embodiment, the pair of wall parts 111a and 111b for rotatably supporting shaft part 141 via bearings 151 are provided to stand in base part 110. The movable object (mirror part 120 in the example of the embodiment) is disposed between the pair of wall parts 111a and 111b.

Thus, the movable object (mirror part 120) is disposed so as to be sandwiched by ball bearings 151 at both sides of the movable object, it is possible to hold the movable object stably, and improve a reliability of with regard to a durability as rotary reciprocating drive actuator 100.

Further, angle sensor part 130 for detecting the rotation angle of shaft part 141 is attached to the outer surface side of the other wall part 111b of the pair of wall parts 111a and 111b. This makes it easy to remove angle sensor part 130 and adjust the assembly position thereof. Since angle sensor part 130 can be easily removed, angle sensor part 130 can be easily replaced when the failure occurs in angle sensor part 130. Further, angle sensor part 130 can be assembled at the final stage of assembly. As a result, the expensive angle sensor part 130 can be assembled after it is confirmed that the assembly of the other components is normal. Therefore, the risk of wasting the expensive angle sensor part 130 due to the assembly failure of the other components can be suppressed.

In one aspect of the present invention, the movement reference position where magnet position holding part 240 magnetically attracts movable magnet 161 and positions movable magnet 161 of the normal state is the rotational center position of rotary reciprocation around shaft part 141 of movable magnet 161.

In one aspect of the present invention, in movable magnet 161, the even number of magnetic poles is magnetized at equal intervals at the outer periphery of shaft part 141. In one aspect of the present invention, magnet position holding part 240 is disposed at the position between the even number of magnetic poles of core body 210 and at the position facing movable magnet 161 in the radial direction of movable magnet 161. Due to these configuration, movable magnet 161, that is, the movable object including shaft part 141 rotates same angular range from the neutral position to one direction and the other direction in the reciprocating manner, thereby maximizing the drive torque and stabilizing the direction of the drive torque.

The above embodiments are merely specific examples for carrying out the present invention, and the technical scope of the present invention should not be construed to be limited by them. That is, the present invention can be implemented in a variety of ways without departing from the spirit or essential features thereof.

In the above embodiment, the case where wall part 111b to attach angle sensor part 130 is formed integrally with base part 110 is described. A wall part to attach angle sensor part 130, however, may not be formed integrally with base part 110 but may be attached to the base part later.

In the above embodiments, the case where drive units 200, 200A, and 200B are mounted on the outer surface side of wall parts 111a and 111b is described. The positions of drive units 200, 200A, and 200B, however, are not limited thereto. Drive units 200, 200A, and 200B may be mounted, for example, on the inner surface side of wall part 111a.

In the above embodiments, the case where the movable object driven by rotary reciprocating drive actuator 100, that is, the movable object attached to shaft part 141 is mirror part 120 is described. The movable object, however, is not limited thereto. For example, a camera or the like may be the movable object.

INDUSTRIAL APPLICABILITY

The present invention is suitable for an optical scanner device and others, for example.

REFERENCE SIGNS LIST 100, 100A Rotary reciprocating drive actuator
110 Base part
111a, 111b Wall part
112 Insertion hole
113 Notched hole
114 Bearing mounting part
120 Mirror part
122 Mirror holder
124 Mirror
122a Insertion hole
130 Angle sensor part
131 Circuit board
132 Optical sensor
133 Connector 134 Encoder disk
135 Case
136, 137, 251 Fastening member
138 Fitting
141 Shaft part
151 Ball bearing
161 Movable magnet
161a, 161b Magnetic pole
161c Magnetic pole switching portion
200, 200A, 200B Drive Unit
210 Core body
211 First core body
211a, 212a Magnetic pole (Core magnetic pole)
211b, 212b Core portion
211c, 212c Other end portion
212 Second core body
213 Connecting core
2132 First side portion
2134 Second side portion
2136 Third side portion
220,220A Coil body
221, 221A First coil
222, 222A Second coil
225, 225a Bobbin
225A Bobbin body
227 Coil
230, 230A Spacer part
240 Magnet position holding part
300 Scanner system
301 Laser emitting unit
302 Laser control unit
303 Drive signal supply unit
304 Position control signal calculation unit

The invention claimed is:

1. A rotary reciprocating drive actuator, comprising:
a base part;
a movable magnet fixed to a shaft part to which a movable object is connected; and
a drive unit including a core body and a plurality of coil bodies disposed around outside of parts of the core body, the drive unit being configured to generate a magnetic flux in the core body when a current is supplied, and drive the movable magnet in a rotary reciprocating manner by an electromagnetic interaction between the magnetic flux generated from the core body and the movable magnet,
wherein the movable magnet is formed in a ring shape, and is configured by alternately magnetizing an even number of magnetic poles forming an S-pole and an N-pole at an outer periphery of the shaft part;
a number of core magnetic poles as magnetic poles of the core body and a number of magnetic poles of the movable magnet are equal to each other;
the core magnetic poles are disposed to face the movable magnet with an air gap therebetween on an outer peripheral side of the movable magnet in a direction orthogonal to the shaft part;
the drive unit is provided with a magnet position holding part which is a magnetic material provided to face the movable magnet and magnetically attracts the movable magnet to a reference position of an operation;
the core body has a shape that connects between one end portion side and another end portion side among an even number of the core magnetic poles so as to surround the even number of the core magnetic poles;
the coil body is disposed at the core body adjacent to each of the even number of the core magnetic poles;
each magnetic pole is disposed with a gap from a portion that surrounds the core magnetic poles in the core body; and
a spacer part is disposed at the gap between each core magnetic pole and the portion.

2. The rotary reciprocating drive actuator according to claim 1,
wherein the reference position at which the magnet position holding part magnetically attracts the movable magnet is a rotational center position of rotary reciprocation of the movable magnet.

3. The rotary reciprocating drive actuator according to claim 1,
wherein each core magnetic pole is disposed close to the portion, and fixed to the portion via the spacer part.

4. The rotary reciprocating drive actuator according to claim 3,
wherein the spacer part is an integral structure with a bobbin of the coil body.

5. The rotary reciprocating drive actuator according to claim 3,
wherein the spacer part is a non-magnetic material.

6. The rotary reciprocating drive actuator according to claim 1,
wherein the spacer part is sandwiched between each core magnetic pole and the portion, and is fixed to both the core magnetic pole and the portion.

7. The rotary reciprocating drive actuator according to claim 1,
wherein the core body includes:
a first core body and a second core body each having a rod-shape and each including the core magnetic pole at a tip portion thereof, in which the coil body is respectively disposed around outside thereof, the first core body and the second core body being disposed in parallel such that the core magnetic poles are faced each other; and
a connecting core formed in a U-shape to surround the first core body and the second core body, and both end portions of the connecting core being jointed to each of base end portions of the first core body and the second core body.

8. The rotary reciprocating drive actuator according to claim 1, further comprising:
an angle sensor part that detects a rotation angle of the shaft part.

9. The rotary reciprocating drive actuator according to claim 1,
wherein the movable object is disposed at a position sandwiched by bearings, and an actuator is disposed at an one side or both sides thereof.

10. The rotary reciprocating drive actuator according to claim 1,
wherein the movable object is a mirror that reflects a scanning light.

* * * * *